R. R. HARRELL.
BALL AND SOCKET JOINT.
APPLICATION FILED NOV. 13, 1911.
1,055,168.
Patented Mar. 4, 1913.
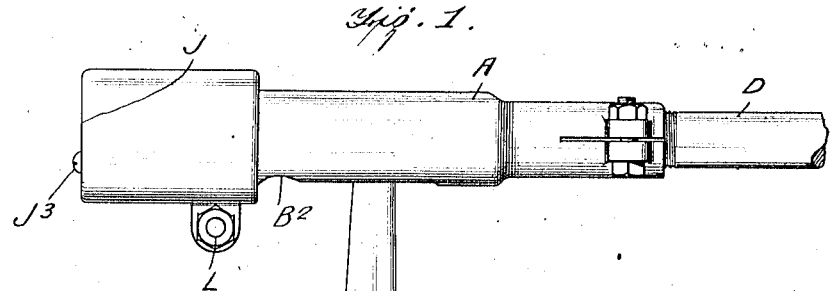
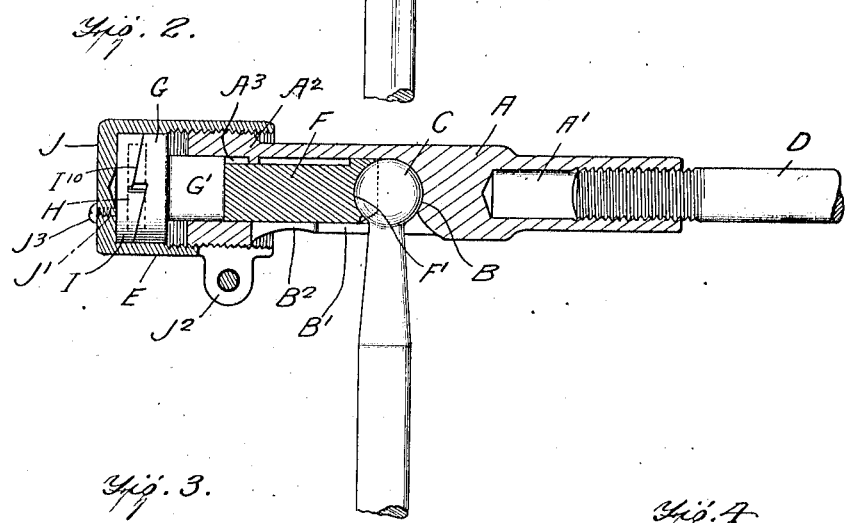
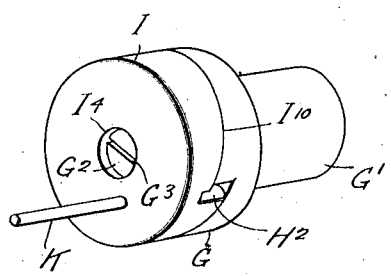
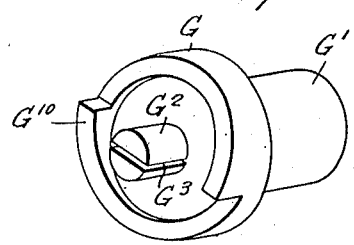
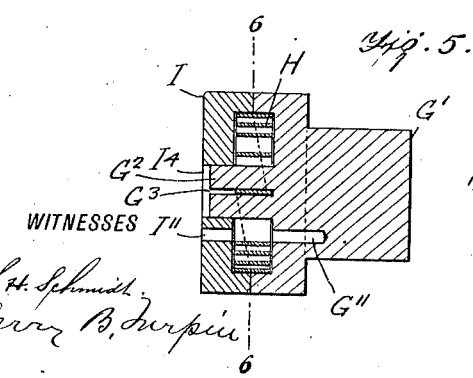
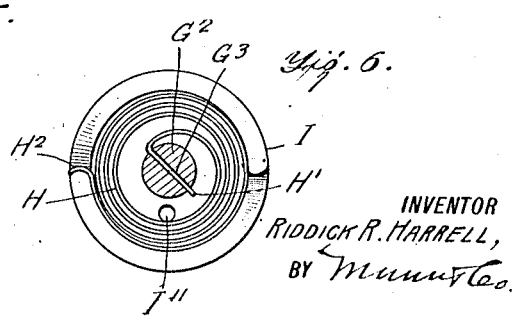
WITNESSES
L. H. Schmidt.
Perry B. Turpin.
INVENTOR
RIDDICK R. HARRELL,
BY Munn & Co.
ATTORNEYS

UNITED STATES PATENT OFFICE.

RIDDICK ROBERT HARRELL, OF SUFFOLK, VIRGINIA.

BALL-AND-SOCKET JOINT.

1,055,168. Specification of Letters Patent. Patented Mar. 4, 1913.

Application filed November 13, 1911. Serial No. 660,018.

*To all whom it may concern:*

Be it known that I, RIDDICK ROBERT HARRELL, a citizen of the United States, and a resident of Suffolk, in the county of Nansemond and State of Virginia, have made certain new and useful Improvements in Ball-and-Socket Joints, of which the following is a specification.

This invention is an improvement in ball and socket joints, seeking to provide a novel and effective construction whereby a constant uniform pressure will be automatically secured upon the ball, and the invention consists in certain novel constructions and combinations of parts, as will be hereinafter described and claimed.

In the drawing Figure 1 is a plan view, Fig. 2 is a sectional elevation of a construction embodying my invention, Fig. 3 is a detail perspective view showing the two cam sections held together by the connecting pin, Fig. 4 is a detail perspective view of one of the cam sections, Fig. 5 is a sectional view drawn axially through the cam sections, and Fig. 6 is a sectional view on about line 6—6 of Fig. 5.

By my invention, I seek to provide a joint that will be automatic in action, in which the wear on both the ball and the socket will be taken up automatically, which will require no considerable adjustment, will eliminate all vibration, will be practically rigid under all conditions, will be durable, thus prolonging the life of the joint, and when installed on the steering device of an automobile it eliminates the danger to human life and destruction of the car incident to the use of ordinary ball and socket joints, wherein provision is not made for taking up the wear.

In carrying out my invention, I employ, in connection with the ball and the seat or abutment therefor, a spring actuated cam mechanism whose action is to press the ball yieldingly to its seat, and I employ in securing this result a novel construction, which I will now describe.

In the construction shown I employ, what for convenience of reference I term, a body A, which is provided with a seat or abutment B, against which the ball C is pressed by the spring-actuated cam mechanism presently described. The body A is socketed at one end at A' to receive the threaded end of a rod D, while the other end of the body has an enlarged threaded head $A^2$ on which the barrel E is threaded. A slot B' leads from the concave seat B for the ball C, and communicates with an opening at $B^2$ through which the ball may be introduced and removed, the body A having a bore $A^3$ leading to its headed end $A^2$.

A plunger-like device F operates in the bore $A^3$, and has its end F' formed to fit the ball, while its other end is pressed upon by the stem G' on the cam disk G, the said stem G' projecting from one side of the cam disk G, while the stud $G^2$ projects from the opposite side of the disk, and is slotted at $G^3$ to receive the inner end H' of a coiled spring H whose outer end $H^2$ engages with the complementary cam disk I, as will be understood from Figs. 3 and 6 of the drawing. The disks G and I have coöperating cam faces $G^{10}$ and $I^{10}$, and the spring H acts, when compressed, to turn the said disks G and I in reverse directions, and this, by the action of the cam faces $G^{10}$ and $I^{10}$, causes the stem G' to project into the body portion A and to press the plunger F against the ball C to the extent to which the section G is moved by the action of the cam faces.

For convenience in holding the disks from accidental movement when the spring H has been contracted, and until said disks may be inserted in position in a barrel E and the latter be properly secured upon the body A, I provide the disks G and I with openings $G^{11}$ and $I^{11}$, which will be brought into register when the disks are turned to contract the spring H, at which time a pin K may be inserted through the disk I and into the disk G to hold said parts from independent turning, the barrel E having at its end plate J provided at J' with an opening through which the pin K may protrude. When the barrel E has been properly adjusted upon the body A, it may be clamped in position by a nut and bolt at L, connecting lugs $J^2$ on opposite sides of a longitudinal slot in the open end of the barrel E. Then the pin K may be withdrawn through the hole J' and the screw $J^3$ be inserted to fill the said hole, as shown in Fig. 1. As best shown in Figs. 3 and 5, the slotted stud $G^2$ on the cam section G enters a central opening $I^4$ in the cam section I, forming a bearing between the said parts G and I in the use of the invention. It is preferred to employ the two expansion disks with cam faces on both, since thereby we secure a greater adjustment or movement of the stem G' in an axial direction with a given circular motion of the cam disk.

The construction is simple and easily applied, and efficiently serves the purpose for which it is designed.

I claim:

1. The combination substantially as herein described of a body portion having a seat for a ball and also having an axial bore extending from said seat, the body portion also having a side slot communicating with said bore, the said slot being formed with an enlarged portion through which a ball may be inserted, a ball fitted to said seat, the said body portion having a threaded end, the barrel screwed on the body portion, means for locking the barrel upon the body portion, expansion disks inclosed within the barrel and having opposing cam surfaces, a spring operating said disks to turn the same relatively, a plunger in the body portion and bearing against the ball, and a stem on one of the disks and bearing against the plunger, substantially as set forth.

2. In an apparatus substantially as described, a pair of concentric coöperating expansion disks provided with openings which may be adjusted into coincidence, a spring for turning said disks relatively, the coincident openings being adapted to receive a pin for temporarily restraining the turning of the disks, substantially as set forth.

3. The combination of a body portion having a seat for a ball, a plunger to bear against the ball, a barrel fitting removably on the end of the body portion, a cam in the barrel and operating upon the plunger, a spring actuating said cam and a pin for locking the said cam from independent movement, the barrel being provided with an opening for the introduction of the said pin, substantially as set forth.

RIDDICK ROBERT HARRELL.

Witnesses:
R. H. RAWLES,
D. L. HARRELL.